(12) United States Patent
Haddad et al.

(10) Patent No.: US 7,255,402 B1
(45) Date of Patent: Aug. 14, 2007

(54) CONCEALED ARMREST

(75) Inventors: Michel E. Haddad, Troy, MI (US); Jennifer P. Lawall, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/391,140

(22) Filed: Mar. 28, 2006

(51) Int. Cl.
*B60N 2/46* (2006.01)

(52) U.S. Cl. .................................. 297/411.32; 297/113
(58) Field of Classification Search .............. 297/113, 297/117, 411.32, 146, 145
See application file for complete search history.

(56) References Cited

U.S. PATENT DOCUMENTS

| | | | | |
|---|---|---|---|---|
| 4,159,145 A | * | 6/1979 | Quakenbush | 297/113 |
| 4,466,664 A | * | 8/1984 | Kondou | 297/411.39 |
| 5,290,092 A | * | 3/1994 | Geer | 297/411.32 |
| 6,471,297 B1 | * | 10/2002 | Runde et al. | 297/411.32 |
| 6,578,922 B2 | * | 6/2003 | Khedira et al. | 297/411.32 |
| 6,752,462 B1 | * | 6/2004 | Kain et al. | 297/411.38 |
| 6,883,871 B2 | * | 4/2005 | Nae et al. | 297/411.32 |
| 7,077,477 B1 | * | 7/2006 | Syrowik et al. | 297/411.32 |

* cited by examiner

*Primary Examiner*—Peter R. Brown

(57) ABSTRACT

An armrest is concealed within a recessed cavity formed in the lateral edge of a seat back. The armrest is mounted on an axle member that extends horizontally into the seat back cavity. A housing member is fixed within the seat back and slidably receives the axle member. A spring urges the axle member to an extended position in which the armrest is ejected from its concealed location within the seat back cavity to enable pivoting movement of the armrest from the vertical stored position to a horizontal armrest forming position. A latch acts between the axle member and the housing member to normally retain the axle member at its stored position within the housing member. A push button is associated with the latch and is pressed by the user to release the latch so that the spring will eject the armrest from the cavity.

18 Claims, 5 Drawing Sheets

CONCEALED ARMREST

FIELD OF THE INVENTION

The present invention relates to an armrest for a vehicle seat and more particularly to an armrest that is concealed within a cavity formed in the lateral edge face of a vehicle seat back.

BACKGROUND OF THE INVENTION

It is well known to equip motor vehicles with seats known as bucket seats or captain chairs that seat just one person. The use of bucket seats is especially desirable in mini-vans and sport utility vehicles. For example, in mini-vans a pair of bucket seats may be used as the second row of seating so that a space remains between the right and left bucket seats. The vehicle users can access a third row of seating that is located behind the second row of seating by reaching between the right and left bucket seats, or by walking between the right and left bucket seats.

It is also known to be desirable to have a pivoting armrest attached to one or both sides of a seat back. Such armrests are typically pivotally mounted on the lateral edge of the seat back and pivot between an upstanding vertical stored position that allows the user to get in and out of the seat, and a horizontal armrest forming position in which the user may rest an arm upon the armrest. The disadvantage of mounting an armrest on the lateral edge of a seat back is that the presence of the armrest will somewhat obstruct the possibility of the vehicle user walking or reaching between the two second row seats in order to access the third row of seating.

Accordingly, it would be desirable to provide a new and improved armrest arrangement in which the armrest could be stored within a recessed cavity in the lateral edge of the seat back, and then selectively deployed to an armrest forming position.

SUMMARY OF THE INVENTION

According to the invention, a recessed cavity is formed in the lateral edge of a seat back. An upholstered armrest has a pivot end at one end thereof and the pivot end is connected with an axle member that extends horizontally into the seat back cavity. A housing member is fixedly mounted within the seat back and slidably receives the axle member. A spring acts on the axle member to urge the axle member to an extended position in which the armrest is ejected from its concealed location within the seat back cavity to enable pivoting movement of the armrest from the vertical stored position to a horizontal armrest forming position. A latch acts between the axle member and the housing member to normally retain the axle member at its stored position within the housing member. A push button is associated with the latch and can be pressed by the seat user to release the latch so that the spring will eject the armrest from its stored position.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
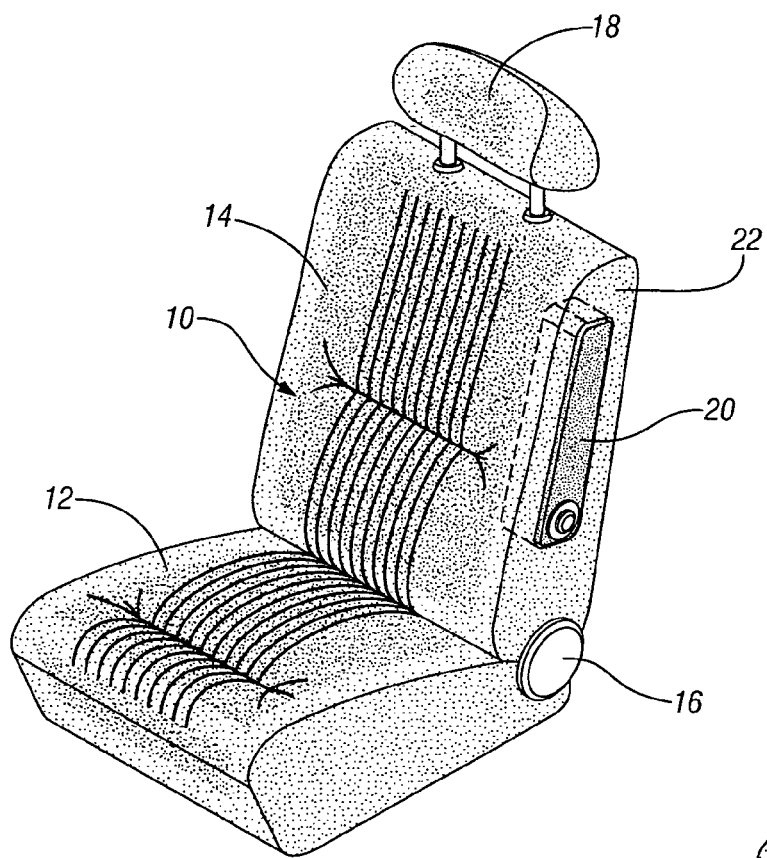
FIG. 1 is a perspective view of a vehicle seat back having a concealed armrest stored within a cavity in the seat back.

Referring to FIG. 1, a bucket-style seat for an automobile is shown at 10 and includes a seat bottom 12 and a seat back 14. The seat back 14 is suitably attached to the seat bottom 12 by an internal seat back frame, not shown, which is connected to the seat bottom 12 by a recliner or pivot mechanism 16. A headrest 18 is provided at the top of the seat back 14. An armrest 20 is mounted on the lateral face 22 of the seat back 14.

Figure 2:
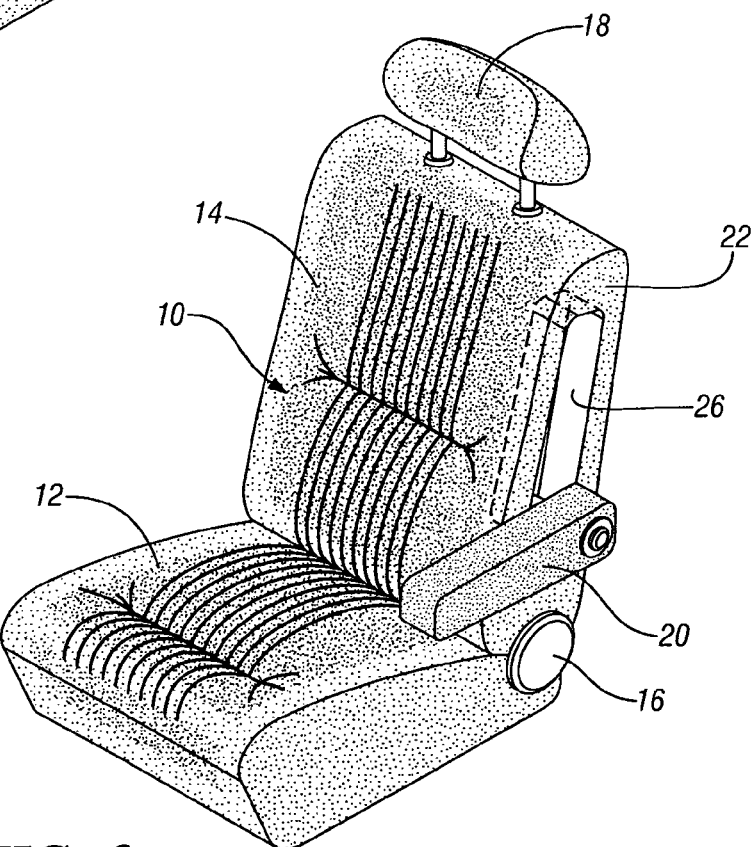
FIG. 2 is a perspective view similar to FIG. 1 but showing the armrest having been extended outwardly from the seat back cavity and pivoted down to an armrest forming position.

Referring to FIG. 2, it is seen that the lateral face 22 of seat back 14 has a cavity 26 provided therein for storing the armrest 20, as will be more particularly described in FIGS. 3-8.

Figure 3:
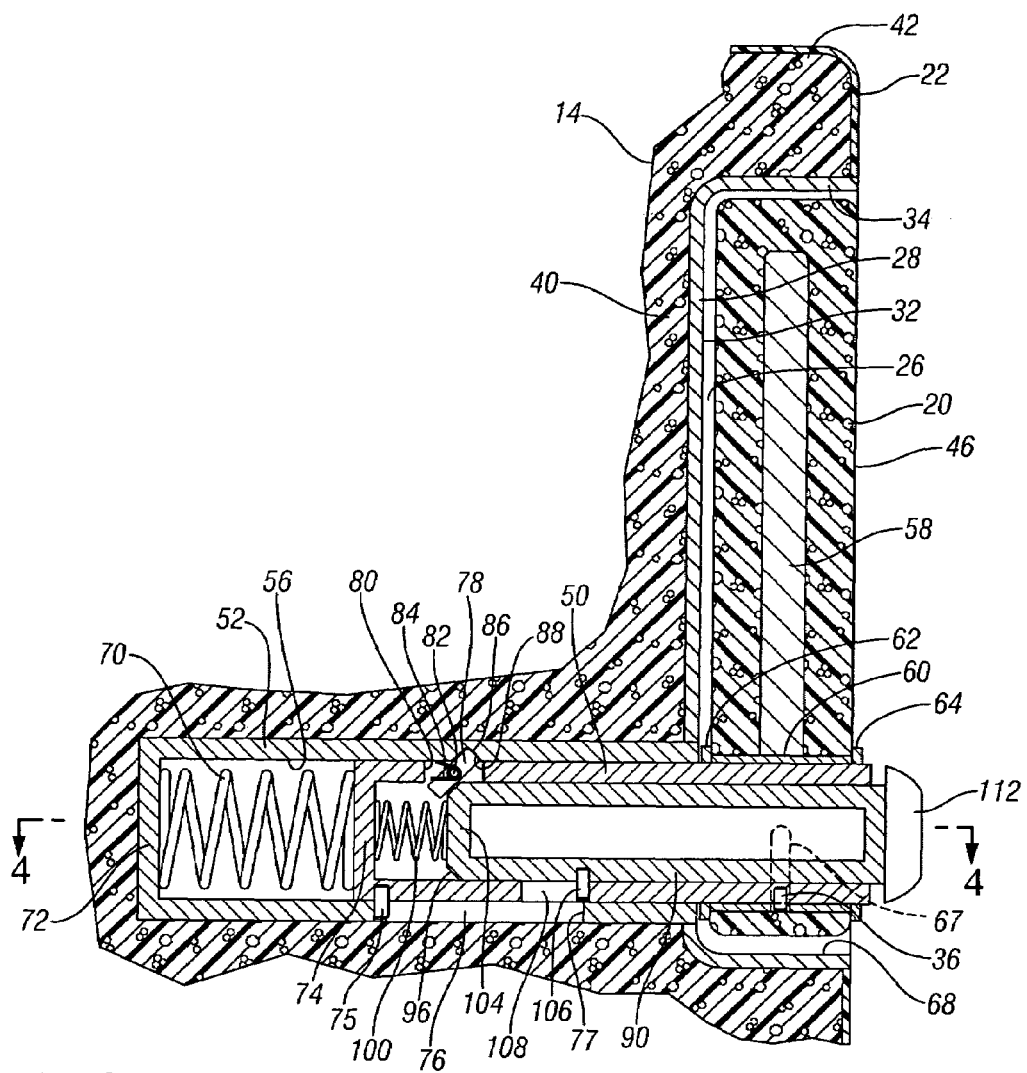
FIG. 3 is a section view taken through the seat back and showing the armrest in its stored position corresponding to FIG. 1.
Figure 4:
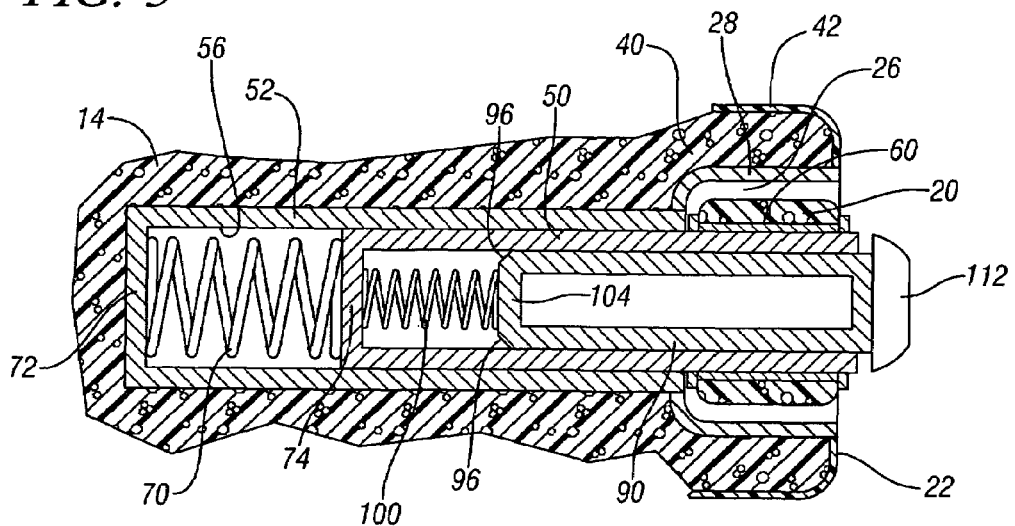
FIG. 4 is a section view taken in direction of arrows 4-4 of FIG. 3.

Referring to FIGS. 3 and 4, it is seen that the armrest storage cavity 26 is provided by a cavity housing 28 which includes a base wall 32, a top wall 34, and a bottom wall 36. The cavity housing 28 is suitably attached to the seat back frame and is surrounded by resilient foam 40 and a vinyl or leather or cloth seat cover 42. As seen in FIGS. 3 and 4, the armrest 20 is stored within the cavity housing 28 so that the outer edge face 46 of the armrest 20 is flush with the lateral face 22 of the seat back 14.

Figure 6:
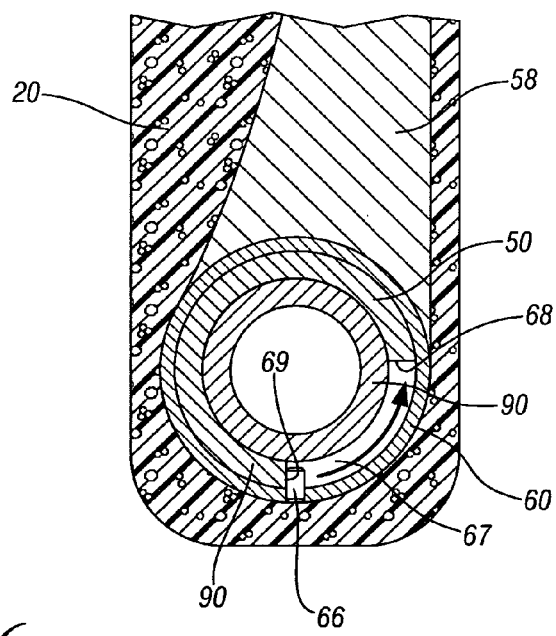
FIG. 6 is a section view taken in direction of arrows 6-6 of FIG. 5.
Figure 7:
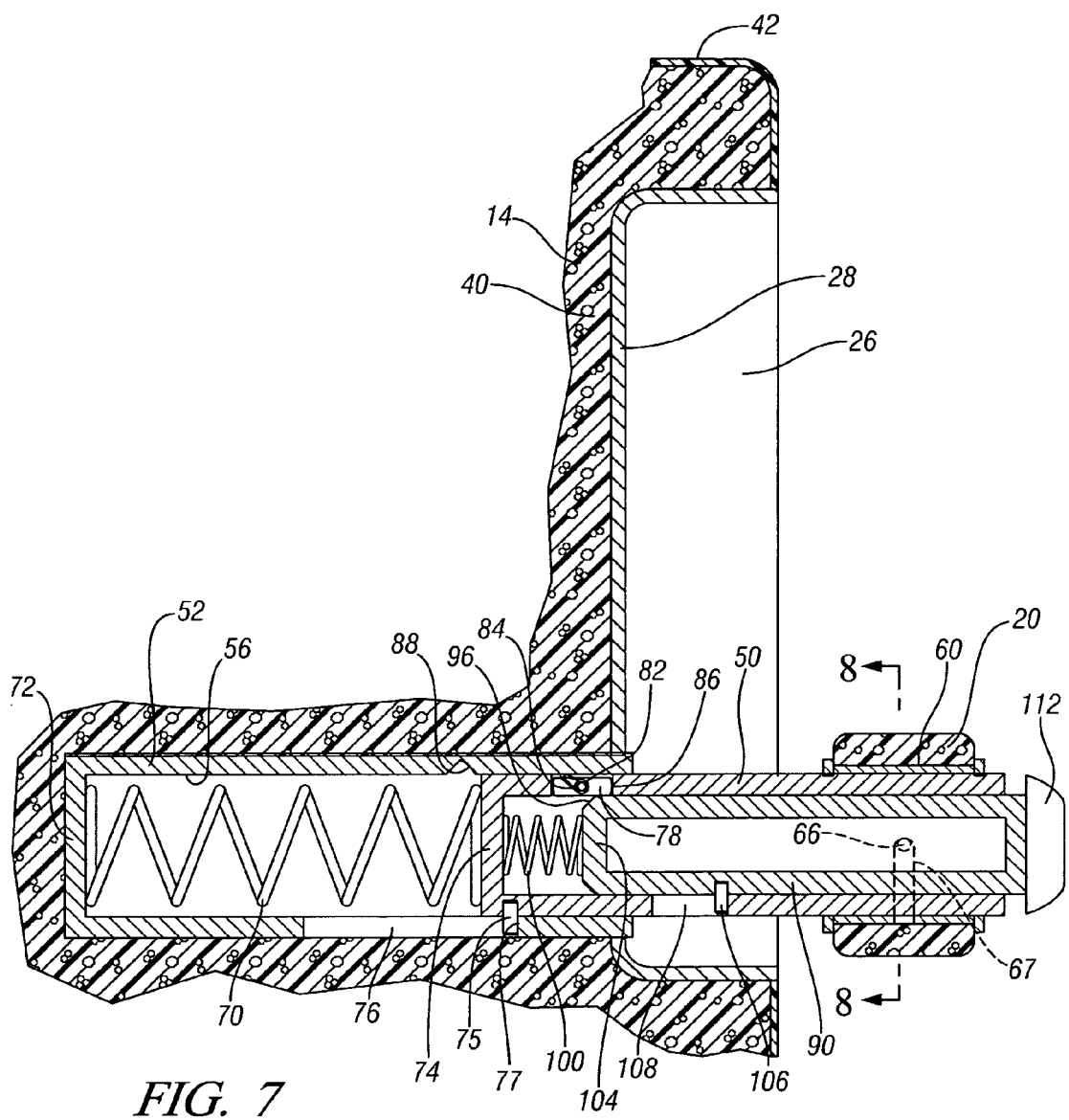
FIG. 7 is a section view similar to FIG. 5 showing that the ejected armrest has been pivoted down to a horizontal armrest forming position.
Figure 8:
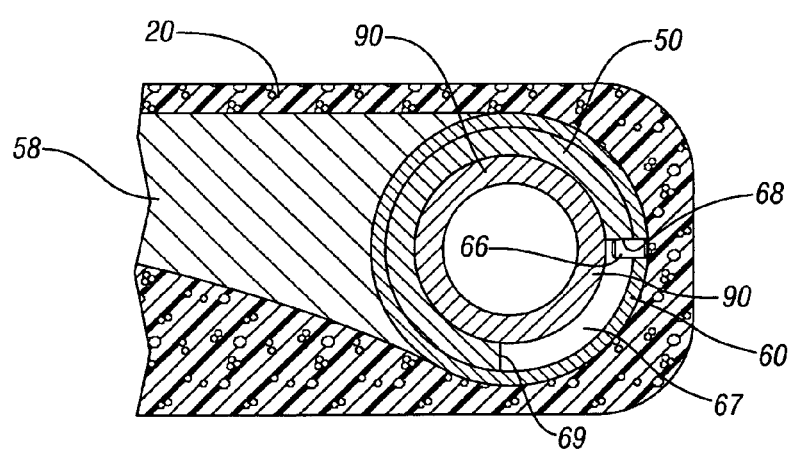
FIG. 8 is a section view taken is direction of arrows 8-8 of FIG. 7.

The armrest 20 is mounted to the seat back 14 by an armrest mounting mechanism that includes an axle member 50 on which the armrest 20 is pivotally mounted and a housing member 52 that is suitably mounted on the internal frame of the seat back 14. In particular, FIGS. 3 and 4 show that the housing member 52 is a cylindrical sleeve that extends horizontally within the seat back 14 and has an open outward end that communicates into the armrest storage cavity 26. The axle member 50 is a hollow cylindrical sleeve that is closely captured and slideable within an inner bore 56 of the housing member 52. The armrest 20 includes a frame 58 that is attached to a bearing sleeve 60. Bearing sleeve 60 is rotatably captured on the outer end of the axle member 50 by retaining rings 62 and 64. As best seen in FIGS. 6 and 8, a stop pin 66 is mounted on the armrest bearing sleeve 60 and rides in a slot 67 cut in the axle member 50. The stop pin 66 engages with an end 68 of the slot 67 when the armrest 20 is in the horizontal position of FIG. 8 and engages with an end 69 of the slot 67 when the armrest 20 is in the vertical position of FIG. 6.

Referring again to FIGS. 3 and 4, a coil compression spring 70 is seated between an end wall 72 of the housing member 52 and an end wall 74 of the axle member 50. The coil compression spring 70 acts to urge movement of the axle member 50 in the direction to extend the axle member 50 out of the armrest storage cavity 26. In FIG. 3, a pin 75 is attached to the axle member 50 and rides in a slot 76 cut in the housing member 52. The pin 75 will engage with an end 77 of the slot 76 to limit the rightward movement of the axle member 50 by the spring 70.

FIG. 3 also shows a latch 78 that is mounted within a small opening 80 of the axle member 50 via a pivot pin 82. A latch spring 84 surrounds the pivot pin 82 and acts on the latch 78 to rotate the latch 78 to its normal position of FIG. 3 in which an outer latching face 86 of the latch 78 is seated within a recess 88 that is cut into the inner bore 56 of the housing member 52. Whenever the latch 78 is in its latched position of FIG. 3, engaging with the recess 88 of the housing member 52, the axle member 50 will be retained in its stored position of FIGS. 3 and 4 against the bias of the coil compression spring 70.

As seen in FIGS. 3 and 4, a push button release mechanism is provided for releasing the latch 78 so that the compression spring 70 can eject the axle member 50 out of the armrest storage cavity 26. In particular the push button release mechanism includes a push button sleeve 90 that is slidable within the inner bore of the axle member 50. The inner most end of the push button sleeve 90 is chamfered at chamfer 96, and, as seen in FIG. 3, the chamfer 96 underlies the latch 78. A coil compression spring 100 is seated between the end wall 74 of the axle member 50 and an end wall 104 of the push button sleeve 90 to urge the push button sleeve 90 rightwardly as viewed in FIG. 3. As seen in FIG. 3, the coil compression spring 100 urges the push button sleeve 90 rightwardly to a normal position where a stop pin 106 mounted on the push button sleeve 90 engages against the end of the slot 108. A push button 112 is mounted on the outer end of the push button sleeve 90. When the push button 112 is pressed in the leftward direction, the push button sleeve 90 is moved leftwardly and its chamfer 96 will engage with the latch 78 and pivot the latch 78 against the bias of the latch spring 84 so that the latch 78 will be moved away from engagement with the recess 88 of the housing member 52.

OPERATION

Referring to FIGS. 1, 3, and 4, it is seen that the armrest 20 is in its vertical fully stored position within the cavity 26 of the seat back 14. The outer face 46 of the armrest 20 is flush with the lateral face 22 of the seat back 14. The armrest 20 cannot be pivoted down to its horizontal use position because the armrest 20 is captured within the confines of the cavity housing 28. Thus, the armrest 20 is fully stored within the seat back 10 and does not take up any space in the vehicle passenger compartment. The armrest 20 is retained in its stored and concealed position by the latch 78 that is pivotally mounted on the axle member 50 and engages within the recess 88 formed in the housing member 52.

Accordingly, if a pair of the bucket seats 10 is mounted in the second row of seats in a mini-van, there can be a clear passageway between left- and right-hand seats so that the vehicle user can access a third row of seats that is located further rearward in the vehicle.

When the vehicle user wishes to deploy the armrest 20 to its normal use position of FIG. 2, the vehicle user will depress the push button 112 mounted on the end of the armrest axle member 50. Pressing the push button 112 will move the push button sleeve 90 leftwardly by compressing the push button coil compression spring 100 and the chamfer 96 on the end of the push button sleeve 90 will engage the latch 78 and rotate the latch 78 away from engagement with the latch recess 88 of the housing sleeve 52. Release of the latch 78 permits the compressed coil compression spring 70 to urge the axle member 50 rightwardly to an extended shown in FIG. 5.

Figure 5:
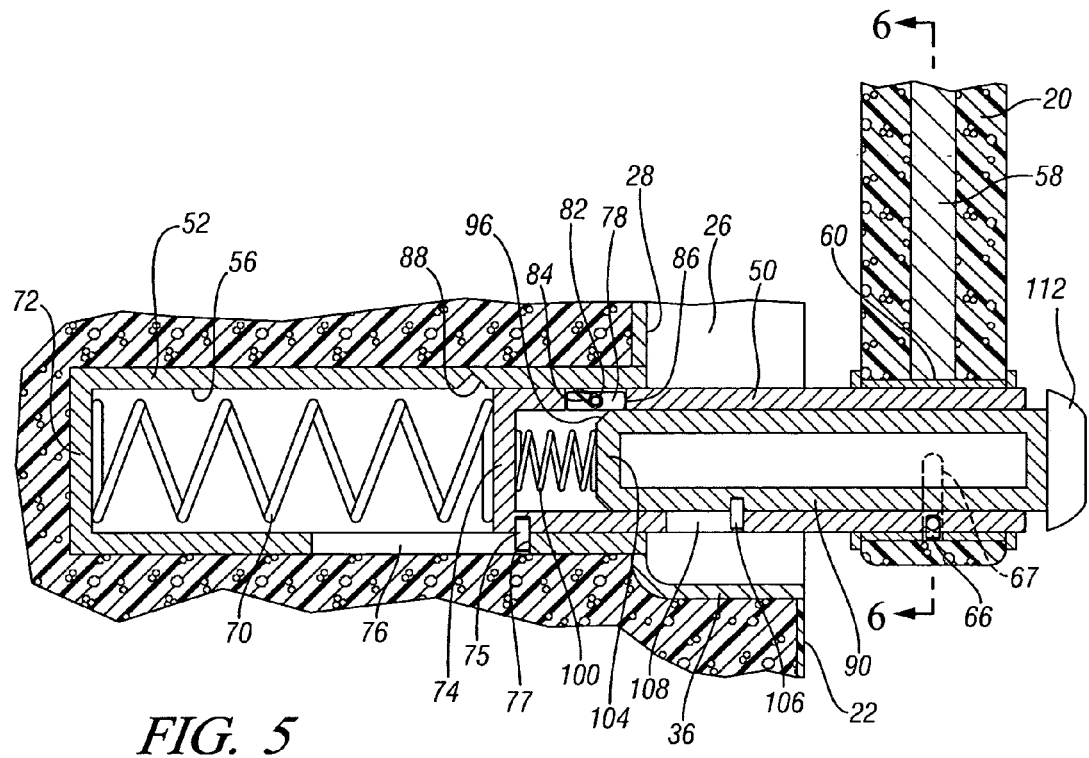
FIG. 5 is a section view similar to FIG. 3 but showing that a push button has released a latch to enable a spring to eject the armrest laterally out of the seat back storage cavity.

As seen in FIG. 5, the axle member 50 has moved rightwardly sufficient to carry the armrest 20 outwardly of the armrest cavity 26 and clear of the lateral face 22 of the seat back 14. The seat user can then rotate the armrest 20 forwardly and downwardly to its normal horizontal armrest forming position of FIGS. 2, 7 and 8. In FIG. 8 the stop pin 66 mounted on the armrest bearing sleeve 60 engages with end 68 of slot 67 in the axle member 50 to establish the horizontal armrest position.

When the armrest 20 is no longer needed by the user, the armrest 20 can be pivoted upwardly and rearwardly to the vertical position of FIGS. 5 and 6. If there is no immediate need to access the third seat, the armrest 20 can be left in the extended and vertical position of FIG. 5 in which the axle member 50 and armrest 20 will remain extended beyond the lateral face 22 of the seat back 14. However, if and when it is desired to improve the access to the third seat, the user will push the armrest 20 leftwardly, thus returning the armrest 20 to its stored position of FIGS. 1 and 3. In this stored position, the latch 78 will be returned to its latching position of FIG. 3 by the latch spring 84 to retain the armrest 20 in the stored position against the biasing effort of the coil compression spring 70.

Thus, referring again to FIG. 1, the armrest 20 is stored and concealed within the seat back so as be hidden and to permit easy access to an area of the vehicle located behind the seat 10.

Figure 9:
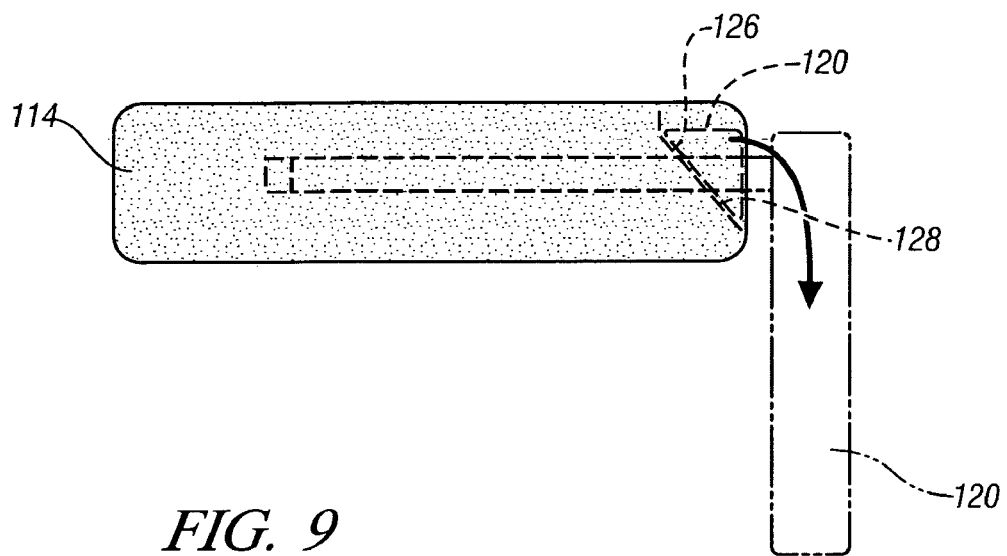
FIG. 9 is a plan view of an another embodiment of the invention showing a seat back with an armrest storage cavity that is open to both the side and the rear of the seat back.
Figure 10:
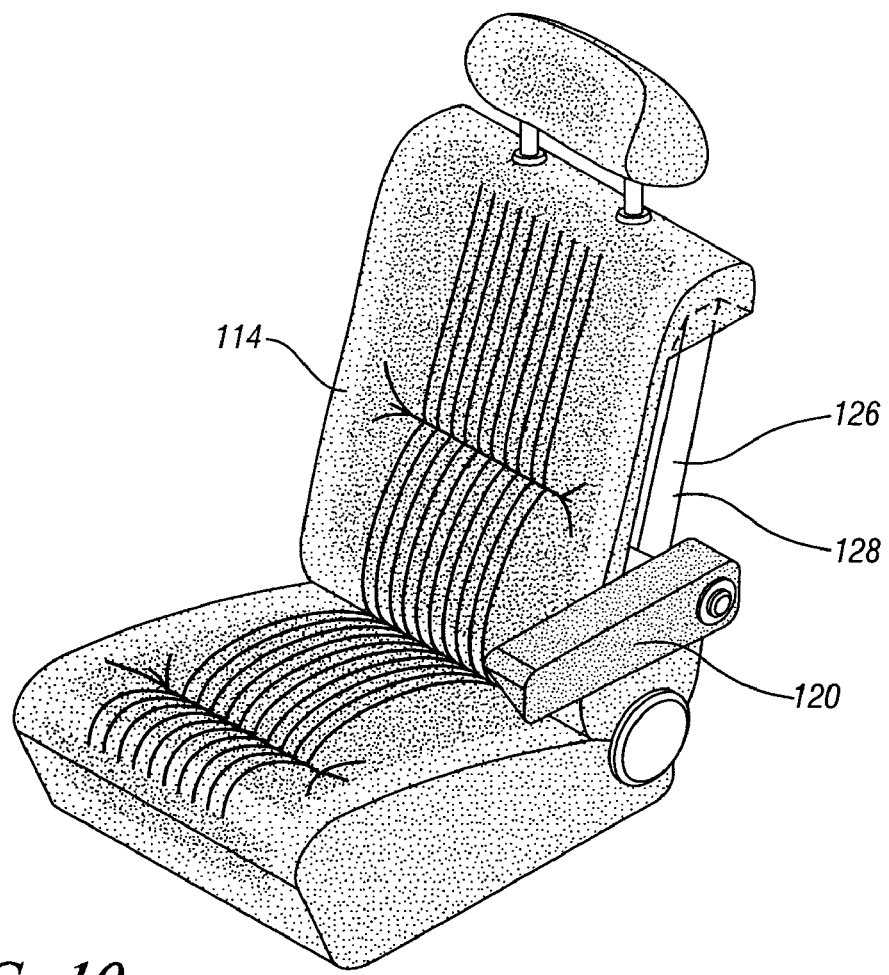
FIG. 10 is a perspective view of the seat back of FIG. 9 but showing the armrest ejected laterally out of the armrest storage cavity and pivoted downwardly to the horizontal armrest forming position.

FIGS. 9 and 10 show another embodiment of the invention that is particularly suited for a seat back 114 that is of relatively thin construction. In this seat back 114, an armrest storage cavity 126 of triangular cross section is formed by a cavity defining wall 128 so that the cavity opens laterally at the side of the seat back 114 and also opens rearwardly at the back of the seat back 114. The armrest 120 is of a triangular cross section so that the armrest 120 stores and conceals within the storage cavity 126. The armrest 120 is mounted on the seat back 120 by a mounting arrangement comprised of an axle member, housing member, springs, and latch mechanism similar to those of the first embodiment of FIGS. 1-8. Thus, as in the case of the first embodiment, the armrest 120 is released from its concealed position of FIG. 1 to its horizontal use position of FIG. 10 by releasing the latch so the spring will extend the armrest 120 out of the storage cavity 126, and then pivoting the armrest 114 downwardly and forwardly to the use position of FIG. 10. Thus, it is seen that the storage and concealment of the armrest 120 can be readily accomplished even within a seat back 114 of relatively thin construction.

The foregoing description of the invention is merely exemplary in nature and, thus, variations are intended to be within the scope of the invention. For example, although the latch mechanism herein is released by a push button mechanism that is housed concentrically within the axle member of the armrest pivot, the push button could just as well be located elsewhere on the vehicle seat and connected to the latch by other types of operating mechanisms, such as a push-pull cable or a lever type linkage, or an electrical or fluid pressure actuator. And although the armrest mounting mechanism is shown herein as concentrically arranged sleeves including an axle sleeve and a housing sleeve, the armrest can be mounted on a mechanism of sliding tracks of roller tracks or other translation mechanism to provide the desired movement of the arm rest between retracted and extended positions relative to the seat back. Furthermore, although the drawings herein show the armrest as being upholstered with a layer of foam that is covered with a material to match the upholstery of the seat back, it will be recognized that the concealed armrest need not be upholstered and may be used in a seat back that is either upholstered or not upholstered.

It will be understood and appreciated that while the concealed armrest of this invention is particularly useful in bucket seats of the type used in mini-vans and utility vehicles, the concealed arm rest may be used in any type of vehicle or any seat or chair, and is not limited to use in motor vehicles.

What is claimed is:

1. A pivoting armrest assembly for a seat back comprising:
   a recessed cavity formed in a lateral face of the seat back;
   a housing member mounted within the cavity of the seat back;
   an axle member slidably mounted in relation to the housing member and being slidable between a retracted position retracted within the recessed cavity and an extended position;
   and an armrest pivotally mounted on the axle member for pivotal movement between a horizontal armrest forming position and a vertical stored position when the axle member is at the extended position.

2. The pivoting armrest of claim 1 further comprising:
   a spring biasing the axle member toward the extended position and a latch acting to retain the axle member in the retracted position until the latch is released to enable the spring to eject the axle member from the retracted position to the extended position.

3. The pivoting armrest of claim 2 further comprising:
   said latch acting between the axle member and the housing member.

4. The pivoting armrest of claim 3 further comprising:
   a push button mounted on the outer end of the axle member and operatively associated with the latch to release the latch when the push button is operated.

5. The pivoting armrest of claim 4 further comprising:
   said push button being spring biased to an extended position and being operated against the bias of the push button biasing spring in order to release the latch.

6. The pivoting armrest of claim 1 in which the axle member moves between the retracted and extended position without rotation relative to the housing member.

7. The pivoting armrest of claim 6 in which a pin and slot connection acts between the axle member and the housing member to guide and limit the retracting and extending movement of the axle member.

8. The pivoting armrest of claim 1 in which the recessed cavity is comprised of a cavity housing mounted in the seat back and having an open side that opens laterally of the seat back.

9. The pivoting armrest of claim 1 in which the recessed cavity is comprised of a cavity wall that opens both laterally of the seat back and rearwardly of the seat back.

10. An armrest hidden within a seat back comprising:
    an armrest;
    a storage cavity provided in the lateral face of the seat back for storing the armrest in a vertical stored and hidden position within the seat back;
    an axle member pivotally connected with the armrest;
    a housing member extending horizontally within the seat back and slidably receiving the axle member;
    a spring acting on the axle member to urge the axle member to an extended position in which the armrest is ejected from the seat back cavity to enable pivoting movement of the armrest from the vertical stored position to a horizontal armrest forming position;
    and a latch acting to latch the axle member in a retracted position to retain the armrest in the vertical stored position.

11. The armrest of claim 10 in which the storage cavity is comprised of a cavity housing mounted in the seat back and having an open side that opens laterally of the seat back.

12. The armrest of claim 10 in which the storage cavity is comprised of a cavity wall that opens both laterally of the seat back and rearwardly of the seat back.

13. The armrest of claim 10 further comprising a push button operable to release the latch.

14. The armrest of claim 13 in which the latch further comprises a latch member pivotally mounted on the axle member and having a latch spring urging the latch member to engage with a latch surface on the housing member to retain the axle member and the armrest in the retracted position.

15. The armrest of claim 13 in which the push button mounted on the axle member includes a button located on the lateral outboard face of the armrest for ready access by the seat user.

16. An armrest assembly for a seat back comprising:
    an armrest;
    means providing a storage cavity in the lateral edge face of the seat back;
    translation means mounting the armrest for lateral movement between a retracted position in which the armrest is stored within the cavity and an ejected position in which the armrest is removed from the storage cavity;
    pivot means acting between the armrest and the translation means whereby the armrest may pivot between a vertical position and a horizontal position; and
    spring means associated with the translation means to urge movement toward the ejected position.

17. The armrest of claim 16 further comprising latch means associated with the translation means to prevent the spring means from moving the translation means to the ejected position until the latch means is operated.

18. An armrest assembly for a seat back comprising:

an armrest;

means providing a storage cavity in the lateral edge face of the seat back;

translation means mounting the armrest for lateral movement between a retracted position in which the armrest is stored within the cavity and an ejected position in which the armrest is removed from the storage cavity;

pivot means acting between the armrest and the translation means whereby the armrest may pivot between a vertical position and a horizontal position; and the means providing a storage cavity includes a cavity wall that opens both laterally of the seat back and rearwardly of the seat back.

* * * * *